US009159329B1

(12) United States Patent
Agiomyrgiannakis et al.

(10) Patent No.: US 9,159,329 B1
(45) Date of Patent: Oct. 13, 2015

(54) STATISTICAL POST-FILTERING FOR HIDDEN MARKOV MODELING (HMM)-BASED SPEECH SYNTHESIS

(71) Applicants: Ioannis Agiomyrgiannakis, London (GB); Florian Alexander Eyben, Munich (DE)

(72) Inventors: Ioannis Agiomyrgiannakis, London (GB); Florian Alexander Eyben, Munich (DE)

(73) Assignee: Google Inc., Mountain View, CA (US)

( * ) Notice: Subject to any disclaimer, the term of this patent is extended or adjusted under 35 U.S.C. 154(b) by 391 days.

(21) Appl. No.: 13/705,710

(22) Filed: Dec. 5, 2012

(51) Int. Cl.
*G01L 13/06* (2006.01)
*G10L 19/02* (2013.01)

(52) U.S. Cl.
CPC .................................... *G10L 19/02* (2013.01)

(58) Field of Classification Search
CPC . G10L 13/02; G10L 25/90; G10L 2021/0135; G10L 2021/105
USPC ......... 704/206, 254, 258, 260, 243, 244, 255, 704/256, 264, 203, 205, 261, 266, 270
See application file for complete search history.

(56) References Cited

U.S. PATENT DOCUMENTS

| | | | | |
|---|---|---|---|---|
| 5,864,809 | A * | 1/1999 | Suzuki .......................... | 704/254 |
| 6,836,761 | B1 * | 12/2004 | Kawashima et al. ......... | 704/258 |
| 2009/0006096 | A1 * | 1/2009 | Li et al. ......................... | 704/260 |
| 2009/0048841 | A1 * | 2/2009 | Pollet et al. ................... | 704/260 |
| 2012/0323569 | A1 * | 12/2012 | Ohtani et al. ................ | 704/206 |

* cited by examiner

*Primary Examiner* — Huyen Vo
(74) *Attorney, Agent, or Firm* — McDonnell Boehnen Hulbert & Berghoff LLP

(57) ABSTRACT

A method and system for improving the quality of speech generated from Hidden Markov Model (HMM)-based Text-To-Speech Synthesizers using statistical post-filtering techniques. An example method involves: (a) determining a scale factor that, when applied to a synthesized reference spectral envelope, minimizes a statistical divergence between a natural reference spectral envelope and the synthesized reference spectral envelope, where the synthesized reference spectral envelope is generated by a state of an HMM; (b) for a given synthesized subject spectral envelope generated by the state of the HMM, determining an enhanced synthesized subject spectral envelope based on the determined scale factor; and (c) generating, by a computing device, a synthetic speech signal including the enhanced synthesized subject spectral envelope.

22 Claims, 8 Drawing Sheets

SYNTHESIZED

NATURAL

STATISTICAL POST-FILTERING FOR HIDDEN MARKOV MODELING (HMM)-BASED SPEECH SYNTHESIS

BACKGROUND

Unless otherwise indicated herein, the materials described in this section are not prior art to the claims in this application and are not admitted to be prior art by inclusion in this section.

Speech technologies such as speech recognition and speech synthesis have many potential applications. The Hidden Markov Model (HMM) is an effective framework for modeling the acoustics of speech. HMM-based frameworks for generating synthesized speech are often used in text-to-speech (TTS) applications. However, the quality of the synthetic speech generate by such frameworks may be noticeably degraded compared with original, or natural, spoken audio.

BRIEF SUMMARY

Described herein, generally, are methods and systems for helping to improve the quality of speech generated from Hidden Markov Modeling (HMM)-based Text-To-Speech (TTS) Synthesizers.

In one aspect, a method involves: (a) determining a scale factor that, when applied to a synthesized reference spectral envelope, minimizes a statistical divergence between a natural reference spectral envelope and the synthesized reference spectral envelope, where the synthesized reference spectral envelope is generated by a state of an HMM; (b) for a given synthesized subject spectral envelope generated by the state of the HMM, determining an enhanced synthesized subject spectral envelope based on the determined scale factor; and (c) generating, by a computing device, a synthetic speech signal that includes the enhanced synthesized subject spectral envelope.

In another aspect, an article of manufacture includes a computer-readable storage medium, having stored thereon program instructions that, upon execution by a computing device, cause the computing device to perform operations including: (a) determining a scale factor that, when applied to a synthesized reference spectral envelope, minimizes a statistical divergence between a natural reference spectral envelope and the synthesized reference spectral envelope, where the synthesized reference spectral envelope is generated by a state of an HMM; (b) for a given synthesized subject spectral envelope generated by the state of the HMM, determining an enhanced synthesized subject spectral envelope based on the determined scale factor; and (c) generating, by a computing device, a synthetic speech signal that includes the enhanced synthesized subject spectral envelope.

In yet another aspect, a system includes a processor, a computer readable medium, and program instructions stored on the computer readable medium and executable by the processor. The program instructions include instructions that cause a computing device to perform operations, including: (a) determining a scale factor that, when applied to a synthesized reference spectral envelope, minimizes a statistical divergence between a natural reference spectral envelope and the synthesized reference spectral envelope, where the synthesized reference spectral envelope is generated by a state of an HMM; (b) for a given synthesized subject spectral envelope generated by the state of the HMM, determining an enhanced synthesized subject spectral envelope based on the determined scale factor; and (c) generating a synthetic speech signal that includes the enhanced synthesized subject spectral envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
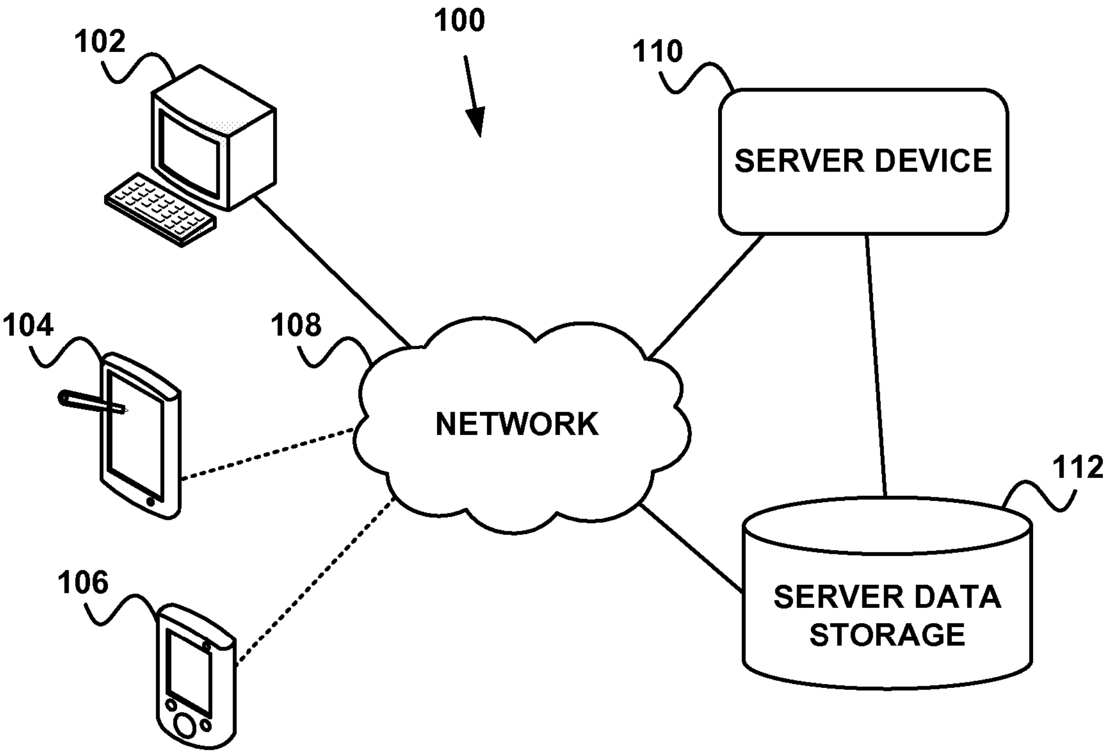
FIG. 1 depicts a distributed computing architecture, in accordance with an example embodiment.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein and illustrated in the figures, can be arranged, substituted, combined, separated, and designed in a wide variety of different configurations, all of which are contemplated herein.

1. Introduction

As noted above, described herein, generally, are methods and systems for helping to improve the quality of speech generated from Hidden Markov Modeling (HMM)-based Text-To-Speech (TTS) Synthesizers. Speech signals generated by HMM synthesizers are often perceived as having a "muffled" quality, which can generally be attributed to both (i) an over-smoothing effect on spectral envelopes due to HMM-based synthesis and (ii) parameterization of the spectral envelopes that make up the synthesized speech signal, among other considerations. The methods and systems described herein may help to counteract this undesirable over-smoothing effect.

At a high level, the method involves determining a scale factor that, when applied to a synthesized reference spectral envelope, minimizes a statistical divergence between a natural reference spectral envelope and the synthesized reference spectral envelope. The synthesized reference spectral envelope is generated by a state of a HMM based on a reference segment of text (i.e., a segment of text taken from a speech corpus containing reference text and corresponding reference spectral envelopes). The speech corpus may generally be used to train the HMM. In this way, a scale factor is determined that, when applied to a spectral envelope generated from a particular HMM state, helps transform the synthesized spectral envelope to a form that more closely resembles an original, or natural, spectral envelope.

In accordance with the present method, the synthesized reference spectral envelope may be parameterized based on a Mel-Cepstral parameterization and may be modeled based on a Multivariate Gaussian model. Similarly, the natural reference spectral envelope may be parameterized based on a Mel-Cepstral parameterization and may be modeled based on a Multivariate Gaussian model. Further, determining the scale factor, may involve determining the scale factor that minimizes the Kullback-Leibler distance between the natural reference spectral envelope and the synthesized reference spectral envelope.

Once the scale factor is determined, it may be applied to a synthesized subject spectral envelope (i.e., a spectral envelope that has been synthesized based on a subject segment of text) so as to generate an enhanced synthesized subject spectral envelope. The synthesized subject spectral envelope may be originally generated based on a segment of text that is the subject of a TTS synthesis process. The effect of applying the scale factor to the synthesized subject spectral envelope is to increase the peak-to-null ratio between the formant peaks and the formant nulls of the synthesized subject spectral envelope. This helps counteract any over-smoothing (and reduces the perception of any "muffled" quality) resulting from the HMM synthesis and/or parameterization of the TTS synthesis process.

Further, the method may optionally involve determining an overemphasis-scale factor based on the scale factor, and applying the overemphasis-scale factor to the synthesized subject spectral envelope. More particularly, the overemphasis-scale factor may be applied to the synthesized subject spectral envelope so as to generate an overenhanced synthesized subject spectral envelope. Application of the overemphasis-scale factor may have a relatively greater effect on the synthesized subject spectral envelope than does the scale factor, and thereby may even further improve the quality of the synthesized subject spectral envelope.

Application of the overemphasis-scale factor may also involve the application of a high-pass transformation matrix so as to reduce the effect of the overemphasis-scale factor at relatively low frequencies. This may be generally advantageous as relatively lower frequencies in spectral envelopes generally do not suffer as severely from oversmoothing as do higher frequencies, and so the overemphasis of such relatively lower frequencies would be unnecessary and/or undesirable.

It should be understood that the example discussed above are provided for purposes of example and explanation only and should not be taken to be limiting.

2. Example Communication System and Device Architecture for Supporting Text-To-Speech Synthesis The methods, devices, and systems described herein can be implemented using client devices and/or so-called "cloud-based" server devices. Under various aspects of this paradigm, client devices, such as mobile phones, tablet computers, and/or desktop computers, may offload some processing and storage functions to remote server devices. These client services may communicate with the server devices via a network such as the Internet. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may also be referred to as "computing devices." Similarly, the "client devices" described herein also may not necessarily be associated with a client/server architecture, and therefore may be interchangeably referred to as "user devices." In some contexts, "client devices" may also be referred to as "computing devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled. And it should be understood that other examples may exist as well.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching. Further, network 108 may take other forms as well.

Server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may include millions of client devices, thousands of server devices, and/or thousands of server data storages. Furthermore, client devices may take on forms other than those shown in FIG. 1.

B. Server Device

Figure 2A:
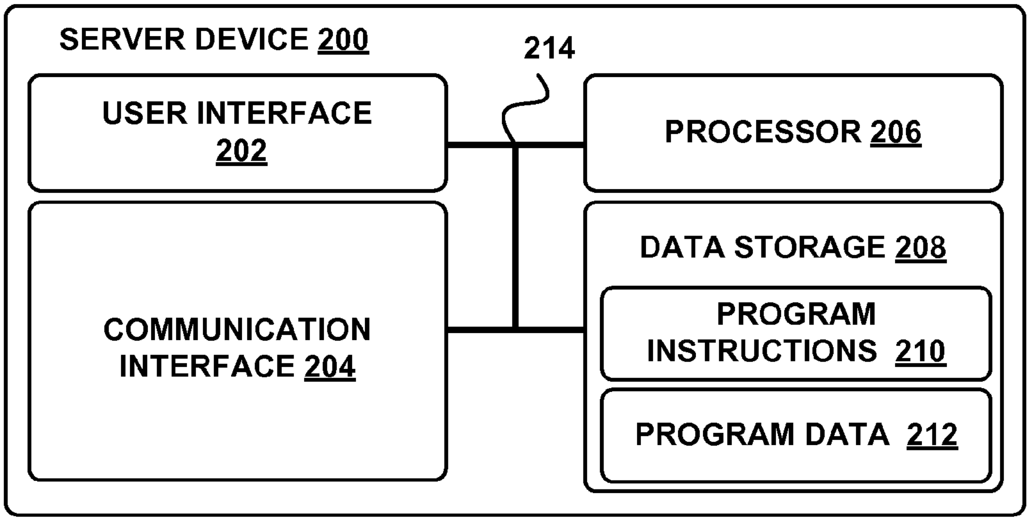
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and/or data storage 208, all of which may be linked together via a system bus, network, or other connection mechanism 214.

User interface 202 may include user input devices such as a keyboard, a keypad, a touch screen, a computer mouse, a track ball, a joystick, and/or other similar devices, now known or later developed. User interface 202 may also include user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network. Other examples of wireless and wireline interfaces may exist as well.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "cloud-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
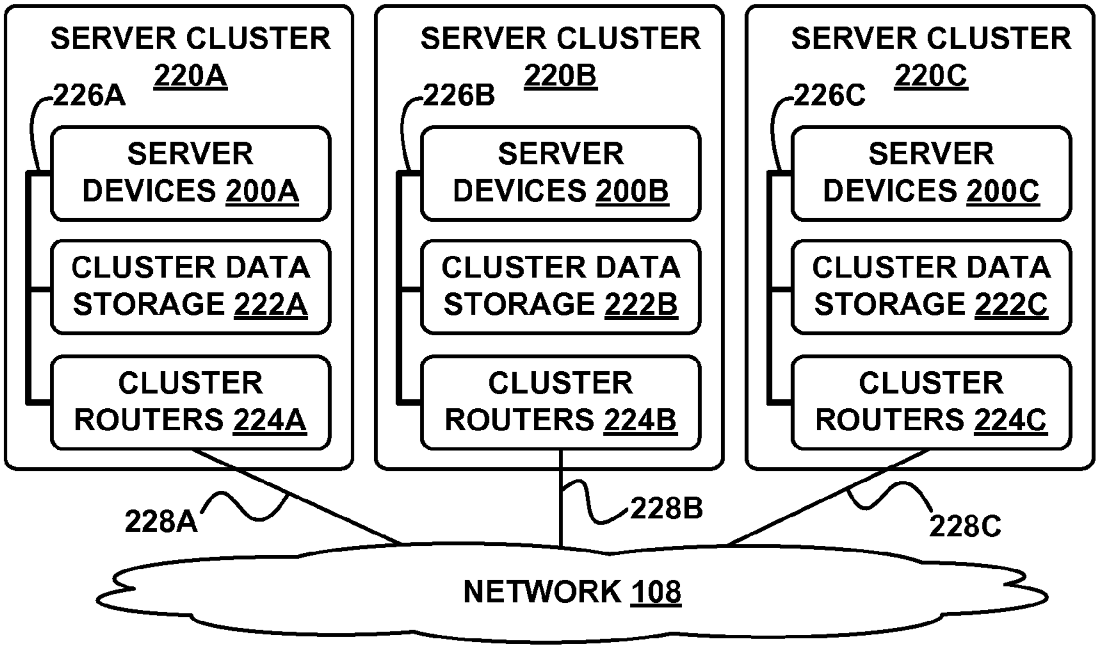
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
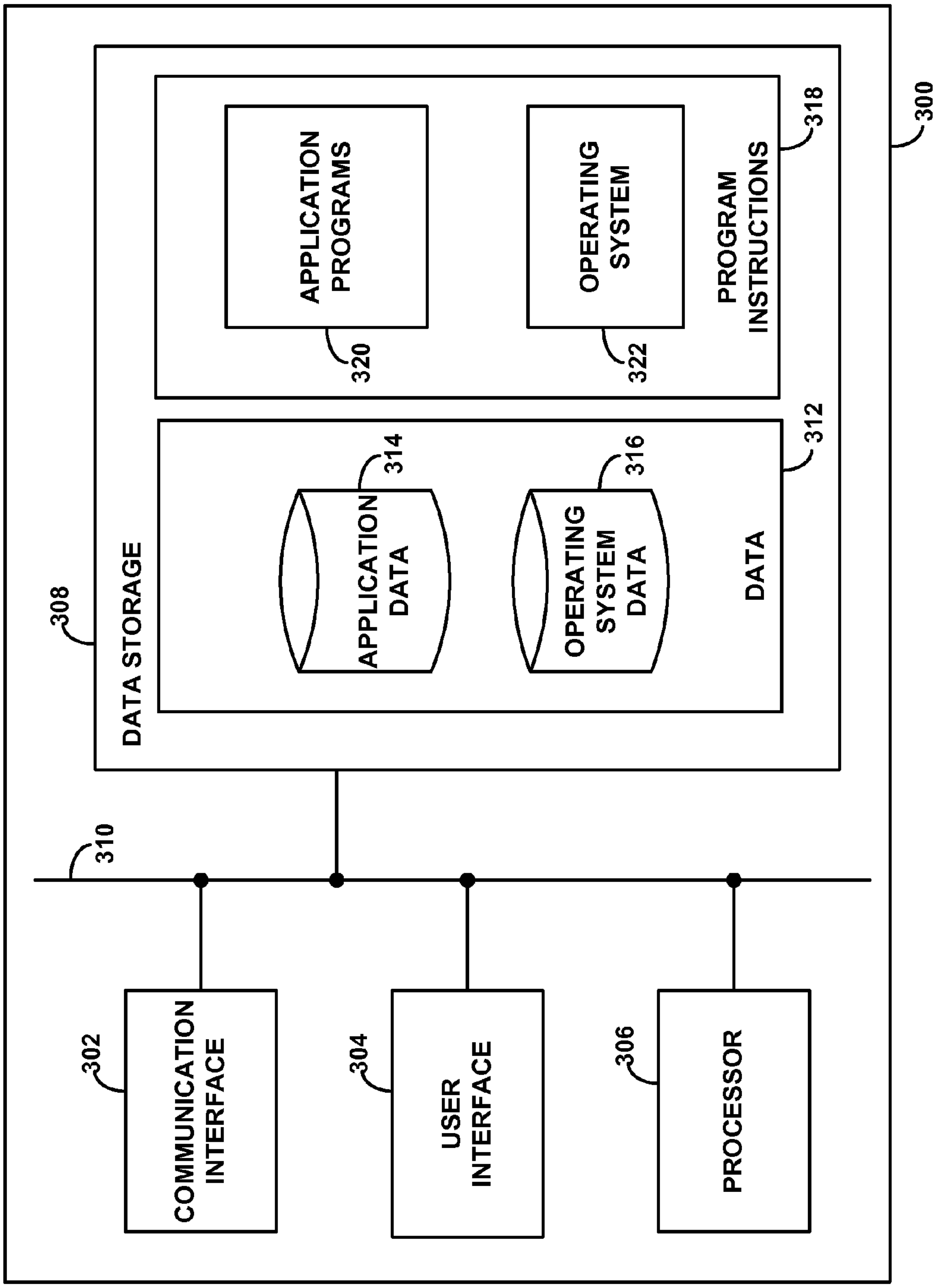
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may include multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may include one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 322 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Text-To-Speech Synthesis System Overview

Before describing statistical post-filtering for HMM-Based Speech Synthesis in detail, it may be beneficial to understand aspects of an overall example TTS synthesis system. Thus, this section describes aspects of TTS systems in general, including how components of a TTS synthesis system may interact with one another in order to facilitate TTS synthesis, and how some of these components may be trained.

Figure 4:
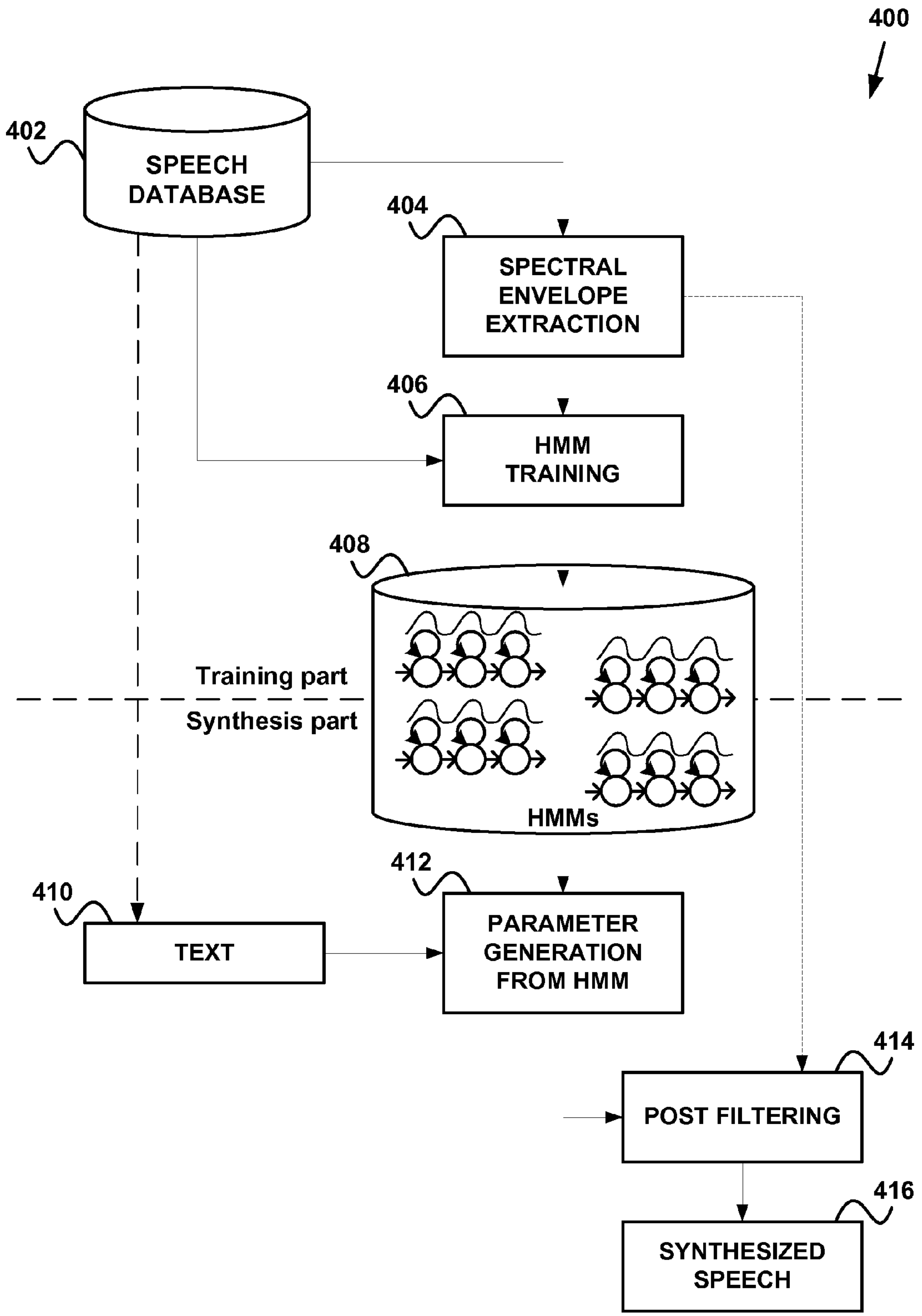
FIG. 4 depicts an overview of a text-to-speech system, in accordance with an example embodiment.

FIG. 4 depicts an example TTS synthesis system 400. At a high level, system 400 includes speech database 402, spectral envelope extraction component 404, an HMM training component 406, HMM database 408, subject text 410, parameter generation component 412, post filtering component 414, and synthesized speech component 416.

Speech database 402 may generally be any suitable speech corpus of speech audio files and corresponding text transcriptions. In one arrangement, speech database 402 may include multiple speech samples. For each speech sample, speech database 402 may include a respective speech audio file and a respective text transcription. In some cases, for each speech sample, speech database 402 may include multiple respective speech audio files. The speech samples may be "read speech" speech samples that include, for example, book excerpts, broadcast news, list of words, and/or sequence of numbers, among other examples. Alternatively, the speech samples may be "spontaneous speech" speech samples that include, for example, dialogs between two or more people, narratives such as a person telling a story, map-tasks such as one person explaining a route on a map to another, and/or appointment tasks such as two people trying to find a common meeting time based on individual schedules, among other examples. Other types of speech samples may exist as well.

Figure 5B:
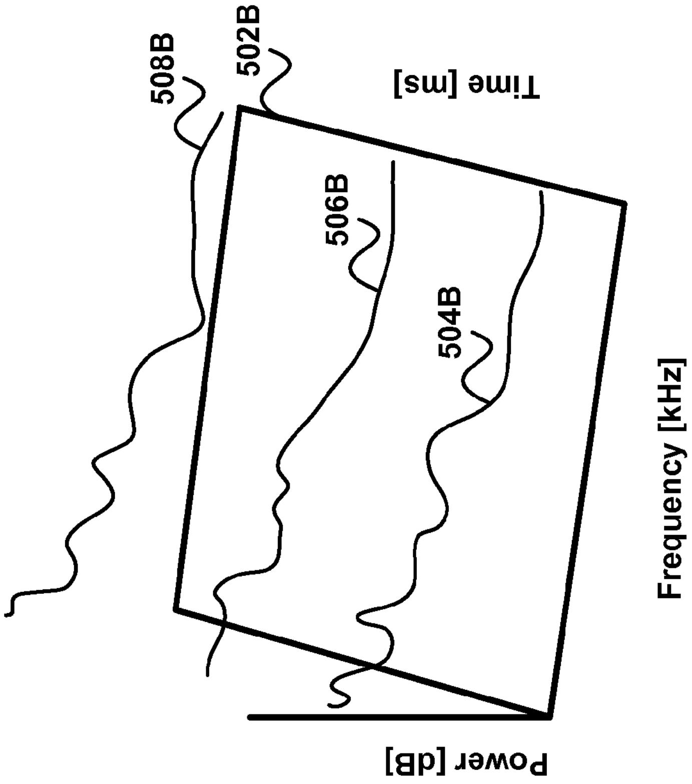
FIG. 5B shows example synthesized spectral envelopes.
Figure 5A:
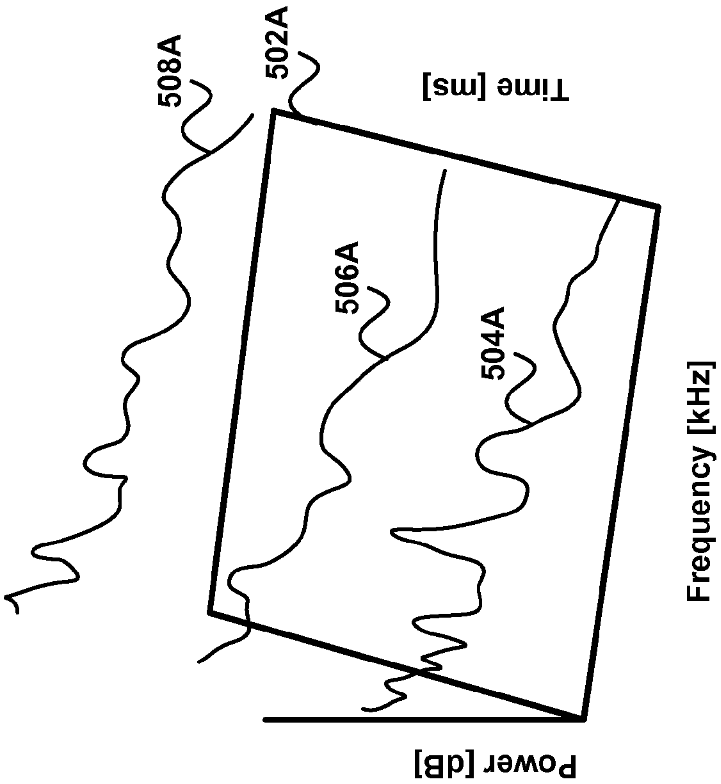
FIG. 5A shows example natural spectral envelopes.

Spectral envelope extraction component 404 may be any suitable combination of hardware and/or software configured to extract spectral envelopes from the speech audio files of speech database 402. FIG. 5A shows natural spectral envelopes 502A corresponding to an example speech audio file of speech database 402. As shown, each natural spectral envelope corresponds to a frequency spectrum of the speech for a respective time interval. For instance, first natural spectral envelope 504A corresponds to a first time interval, second natural spectral envelope 506A corresponds to a second time interval, and third spectral envelope 508A corresponds to a third time interval. Of course, the example shown in FIG. 5A is shown for purposes of example and explanation only, and it should be understood that the various spectral envelopes may take on any one of a number of forms, and may possess any variety of power, frequency, and/or time characteristics. Further, spectral envelope extraction component 404 may also extract any other suitable information used to train the HMM synthesizer as will be understood by those of ordinary skill in the art (such as, for example, fundamental frequency information).

As will be discussed in more detail later, natural spectral envelopes 502A may correspond to a number of respective synthesized spectral envelopes 502B, perhaps generated by TTS synthesis system 400, such as those shown in FIG. 5B. As noted, HMM synthesis and/or parameterization of the synthesized spectral envelopes may generally give rise to undesirable "over-smoothing" of the synthesized spectral envelopes—the statistical modeling process involved with HMM synthesis generally tends to remove some details of the natural spectral envelopes. Thus, as reflected in FIG. 5B, synthesized spectral envelopes 504B, 506B, and 508B (corresponding, respectively, to natural spectral envelopes 504A, 506A, and 508A), are generally smoothed compared with the natural spectral envelopes. As a general matter, the smoothing of the spectral envelopes may desirably reduce error in the generation of synthesized spectral envelopes; however, it also causes the degradation of the naturalness of synthetic speech because it removes details of the natural spectral envelopes.

Spectral envelope extraction component 404 may also be generally configured to parameterize the spectral envelopes. Any suitable parameterization technique may be used. In one example, a Mel-Cepstral (MCEP) Parameterization of the spectral envelopes may be used. As a general matter, a vector of coefficients corresponding to the MCEP may be generated that, taken together represent the spectral envelope. More particularly, as will be understood by those of skill in the art, the MCEP coefficients may represent magnitude and phase information corresponding to a speech audio file (or particular natural spectral envelope), based on a linear cosine transform of a log power spectrum on a nonlinear mel scale of frequency.

Figure 6:
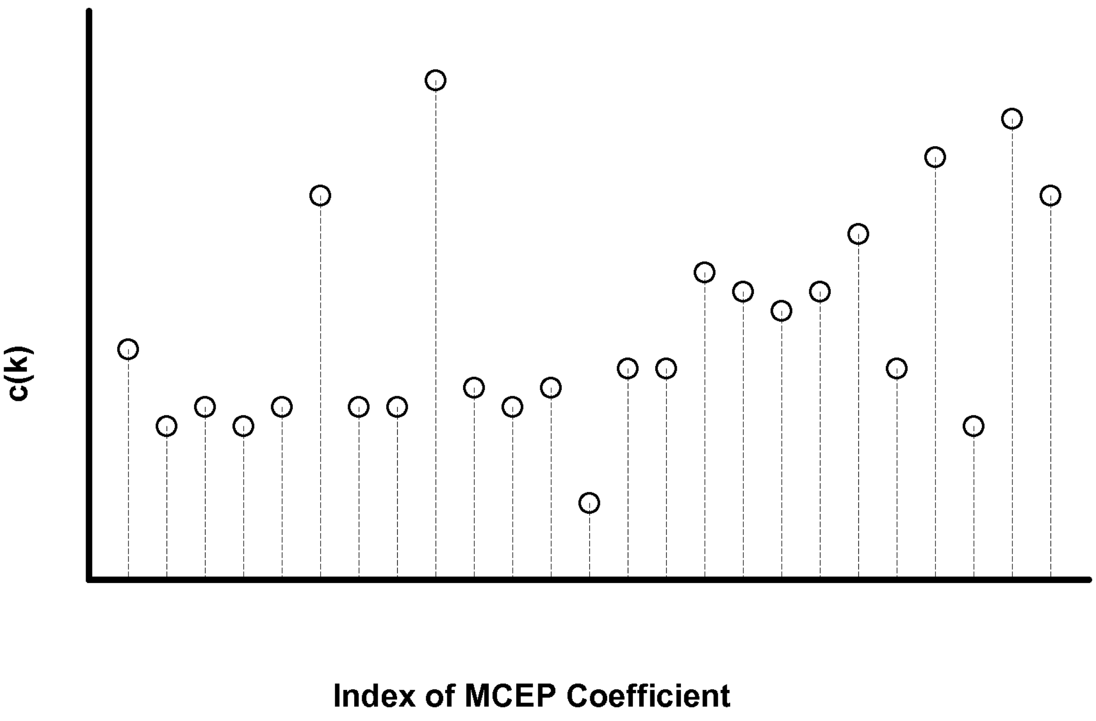
FIG. 6 shows an example Mel-Cepstral Parameterization of a spectral envelope.

For purposes of example and explanation, FIG. 6 depicts a representative MCEP Parameterization of spectral envelope 504A, where the horizontal axis has the index of the MCEP coefficient and the vertical axis has the amplitude of the corresponding MCEP coefficient. The MCEP indices are related to the underlying quefrencies of the mel-scaled cepstrum. The various amplitudes depicted in FIG. 6 may be understood to correspond to a particular MCEP coefficient, the collection of which makes up a vector that is a MCEP-parameterized representation of spectral envelope 504A. It should be further understood that the amplitudes depicted in FIG. 6 do not necessarily reflect real, approximate, or even representative MCEP coefficients, but are shown only for purposes of example.

HMM training component 406 performs training of context-dependent HMM models, where context of reference text and audio from speech database 402, among other considerations, may be taken into account. Those of skill in the art will understand that an HMM is a statistical model that may be used to determine state information for a Markov Process when the states of the process are not observable. A Markov Process undergoes successive transitions from one state to another, with the previous and next states of the process depending, to some measurable degree, on the current state. In the context of speech synthesis, in the HMM training process, speech parameters such as spectral envelopes are extracted from speech waveforms (as described above) and then their time sequences are modeled by context-dependent HMMs. HMM database 408 may store information corresponding to the trained HMM, including various HMM states, that may be used to synthesize speech.

During synthesis of a given segment of text 410, parameter generation component 412 generates spectral envelopes (or a corresponding set of MCEP coefficients) for the given segment of the text. Then, a given synthesized utterance may be generated by synthesized speech component 414 by concatenating the output from pertinent context-dependent HMMs, each corresponding to a respective given segment of the subject text.

Note also that, in accordance with the system and methods described herein, the output from the parameter generation component 412 may be filtered by a post filtering component 414. As discussed further below, post filtering component 414 may improve the overall quality of the synthesized speech that is ultimately generated by synthesized speech component 416. Synthesized speech component 416 may include hardware and/or software configured to carry out any suitable audio-signal generation technique including for example, various vocoding techniques, to generate a speech waveform from the speech parameters generated by parameter generation component 412, and filtered by post filtering component 414.

It should be noted that the discussion in this section, and the accompanying figures, are presented for purposes of example. Other TTS synthesis system arrangements, including different components, different relationships between the components, and/or different processing, may be possible.

4. Example Operations

Figure 7:
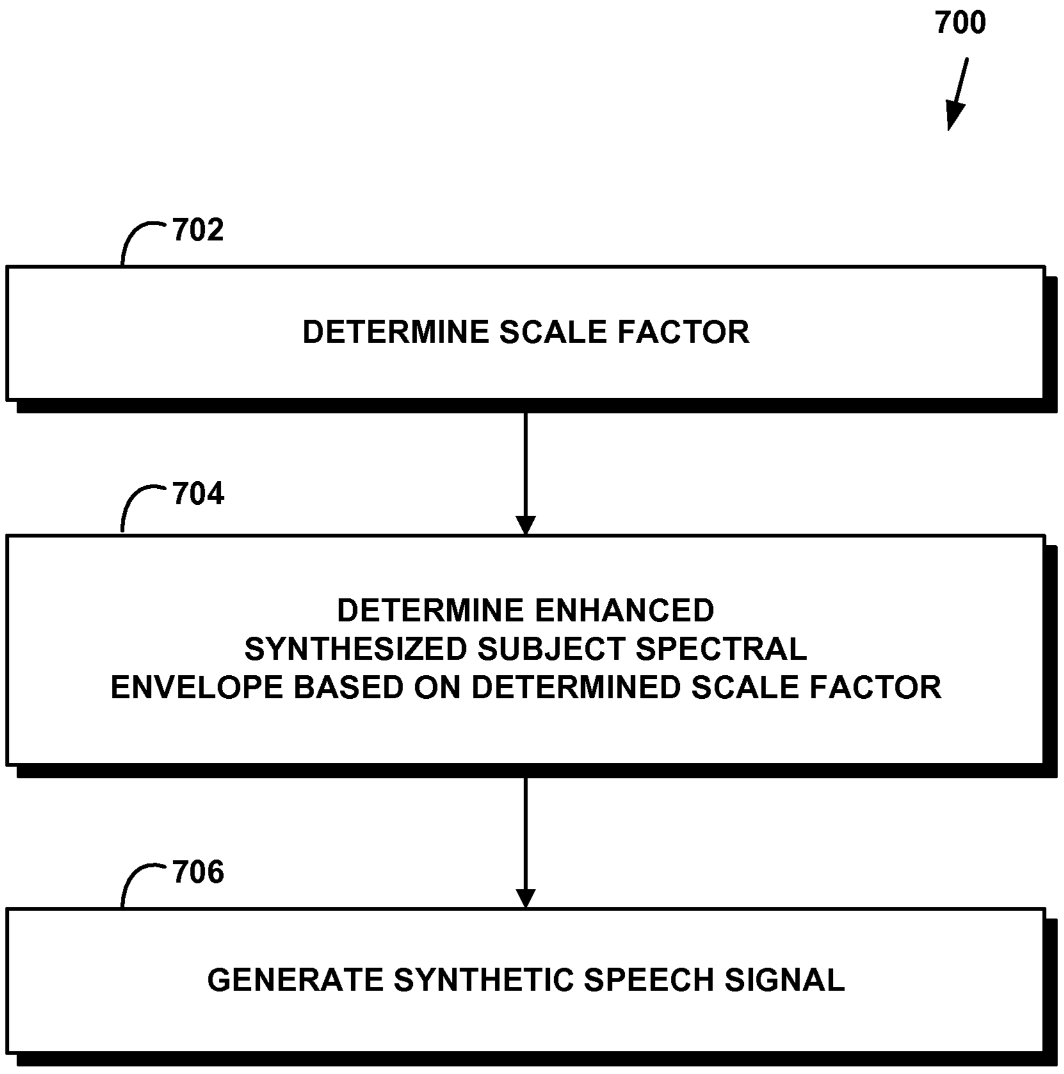
FIG. 7 is a flow chart, in accordance with an example embodiment.

FIG. 7 is a flowchart showing aspects of an embodiment of an example method 700. The blocks illustrated by this flowchart may be carried out by various computing devices, such as client device 300, server device 200, and/or server cluster 220A. Aspects of some blocks may be distributed between multiple computing devices. And aspects of some blocks may be carried out by other devices as well.

Furthermore, those skilled in the art will understand that the flowchart described herein illustrates functionality and operation of certain implementations of example embodiments. In this regard, each block of the flowchart may represent a module, a segment, or a portion of program code, which includes one or more instructions executable by a processor (e.g., any of those processors described herein) for implementing specific logical functions or steps in the process. The program code may be stored on any type of computer readable medium (e.g., any computer readable storage medium or non-transitory media described herein), such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Example method 700 involves, as shown by block 702, a computing device determining a scale factor that, when applied to a synthesized reference spectral envelope, minimizes a statistical divergence between a natural reference spectral envelope and the synthesized reference spectral envelope, where the synthesized reference spectral envelope is generated by a state of a HMM. At block 704, for a given synthesized subject spectral envelope generated by the state of the HMM, the computing device determines an enhanced synthesized subject spectral envelope based on the determined scale factor. And at block 706, the computing device generates a synthetic speech signal that includes the enhanced synthesized subject spectral envelope.

Each of these blocks are discussed in further detail below.

a. Determine Scale Factor

At block 702, method 700 involves a computing device determining a scale factor that, when applied to a synthesized reference spectral envelope, minimizes a statistical divergence between a natural reference spectral envelope and the synthesized reference spectral envelope, where the synthesized reference spectral envelope is generated by a state of an HMM. In this way, a scale factor is determined that, when applied to a synthesized subject spectral envelope generated by the HMM state (in accordance with block 704, discussed further below), helps transform the synthesized subject spectral envelope to a form that more closely resembles a natural spectral envelope.

With reference to FIG. 4, for purposes of example and explanation, consider a synthesized reference spectral envelope generated from parameter generation component 412 by an HMM state present in HMM database 408. The synthesized reference spectral envelope may be generated based on a reference text segment that is present in speech database 402. Note that speech database 402 may also contain a speech audio file corresponding to the reference text segment, from which a natural reference spectral envelope can be obtained. Thus, after synthesis of the synthesized reference spectral envelope by TTS synthesis system 400, there exists the natural reference spectral envelope and the synthesized reference spectral envelope, each corresponding to the reference text segment. It is this natural reference spectral envelope and synthesized reference spectral envelope that may be used by the computing device to determine the scale factor in accordance with block 702.

In an example, the natural reference spectral envelope may be a parameterized natural reference spectral envelope that the computing device parameterizes based on a mel-cepstral parameterization. This parameterization may be performed by spectral envelope extraction component 404. Thus, the computing device may represent the natural reference spectral envelope using a suitable vector of MCEP coefficients.

Similarly, the synthesized reference spectral envelope may be a parameterized synthesized reference spectral envelope that the computing device parameterizes based on a mel-cepstral parameterization. This parameterization may be performed by parameter generation component 412. Thus, the computing device may represent the synthesized reference spectral envelope using a suitable vector of MCEP coefficients. In this way, each HMM state in the TTS synthesis system 400 may be arranged to provide an output vector of MCEP coefficients that represents a corresponding synthesized reference spectral envelope. As will be discussed further below, use of the MCEP coefficients that represent corresponding synthesized reference spectral envelopes can enable post-filtering of the synthesized reference spectral envelopes and convenient re-synthesis of speech directly from the MCEP coefficients, among other advantages.

Further, in an example, the synthesized reference spectral envelope may be a modeled synthesized reference spectral envelope that the computing device models based on a Multivariate Gaussian model. Similarly, the natural reference spectral envelope may be a modeled natural reference spectral envelope that the computing device models based on the Multivariate Gaussian model. As will be discussed further below, modeling of the respective spectral envelopes based on the Multivariate Gaussian model further facilitates advantageous statistical analysis of the natural reference spectral envelope and the reference spectral envelope.

As a general matter, the computing device determining the scale factor (also referred to herein at times as "ρ") that minimizes the statistical divergence between the natural reference spectral envelope and the synthesized reference spectral envelope may be done in any suitable manner. In one particular example, determining the scale factor that minimizes the statistical divergence between the natural reference spectral envelope and the synthesized reference spectral envelope may involve determining the scale factor that minimizes the Kullback-Liebler distance between the natural reference spectral envelope and the synthesized reference spectral envelope. As those of ordinary skill in the art will appreciate, a Kullback-Liebler distance is a distance from a first probability distribution (sometimes referred to as a "true" probability distribution) to a second probability distribution (sometimes referred to as a "target" probability distribution). With respect to the present method, one may understand the synthesized reference spectral envelope (or the Multivariate Guasian model thereof) to be the "true" probability distribution for purposes of consideration of the Kullback-Liebler distance between the natural reference spectral envelope and the synthesized reference spectral envelope. Correspondingly, one may understand the natural reference spectral envelope (or the Multivariate Guasian model thereof) to be the "target" probability distribution for purposes of consideration of the Kullback-Liebler distance between the natural reference spectral envelope and the synthesized reference spectral envelope.

The computing device may determine the scale factor that minimizes the Kullback-Liebler distance between the natural reference spectral envelope and the synthesized reference spectral envelope in any suitable manner. In one particular example, computing device may determine the scale factor that minimizes the Kullback-Liebler distance between the natural reference spectral envelope and the synthesized reference spectral envelope based on a scalar minimization process whereby a set of possible scale factors, each within a certain interval decimated by a predetermined number, are each tested to see which possible scale factor minimizes the statistical difference. Thus, determining the scale factor may involve determining the statistical difference corresponding to each potential scale factor in the set of potential scale factors. The number of potential scale factors in the set of potential scale factors may generally be a predetermined number, and each potential scale factor from the set of potential scale factors may generally have a unique value that is within a predetermined interval. Ultimately, the computing device may select as the scale factor the potential scale factor in the set of scale factors having the smallest corresponding determined statistical difference.

For purposes of example and explanation let the Multivariate Guasian of the synthesized reference spectral envelope be represented by P and the Multivariate Guasian of the natural reference spectral envelope be represented by Q, over a given frequency range x of the spectral envelopes in the frequency domain. The Kullback-Leibler distance between P and Q may be represented as:

$$D_{KL}(P\|Q) = \int_x \ln\frac{dP}{dQ}\,dP = \int_x \frac{dP}{dQ}\ln\frac{dQ}{dP}\,dQ$$

To minimize the Kullback-Leibler distance in accordance with the present disclosure, each potential scale factor in the set of scale factors may be applied to the synthesized reference spectral envelope P, and the corresponding $D_{KL}$ may be determined. The potential scale factor associated with the smallest $D_{KL}$ may then be selected as the scale factor.

In a particular example, there may be 256 potential scale factors in the set of potential scale factors. Further, the predetermined interval of the set of potential scale factors may be [1.0 to 1.10]. Thus, for instance, the set of potential scale factors may be (approximately) [1.0, 1.00039, 1.00078, . . . 1.10]. And although this is one example of the set of potential scale factors, it is but one example, and other sets of potential scale factors may be used as well.

As a general matter, although portions of example method 700 are described with respect to a single natural reference spectral envelope and a single corresponding synthesized reference spectral envelope (or a single corresponding HMM state), it should be understood that, in practice, a scale factor may be similarly determined for each HMM state of the HMM model. The respective scale factors (determined for each HMM state) may be stored in a look-up table for later use. The scale factors may be stored locally, remotely, or in any other suitable location. Further, the scale factors may be stored using any desired extent of memory. In an example, each scale factor may be stored using 8 bits. In another example, each scale factor may be stored using 16 bits.

In addition to determination of the scale factor, the computing device may also determine an overemphasis-scale factor based on the scale factor. As a general matter, the overemphasis-scale factor may be used by the computing device to increase the effect of the scale factor on a synthesized subject spectral envelope. Therefore, upon application of the overemphasis-scale factor to the synthesized subject spectral envelope (as opposed to, for example, the scale factor), the computing device may generate an overenhanced synthesized subject spectral envelope (as is discussed further below in connection with block 704). In other words, instead of determining an "enhanced synthesized subject spectral envelope" based on the determined scale factor, the computing device may determine an "overenhanced synthesized subject spectral envelope" based on the overemphasis-scale factor. And as a general matter, the overemphasis-scale factor may be determined based on the determined scale factor and a predetermined overemphasis multiplier.

In a particular example, the overemphasis-scale factor may be determined according to the following formula:

$$\hat{\rho}=\rho^{\lambda} \qquad \text{[equation 1]}$$

where $\lambda$ is the overemphasis multiplier, $\hat{\rho}$ is the overemphasis-scale factor, and $\rho$ is the scale factor (determined based on the process of minimizing the statistical divergence between the natural reference spectral envelope and the synthesized reference spectral envelope described above).

$\lambda$ may take on any desired value within a predetermined interval. The predetermined interval may be constrained to generally desirable values. In an example, the lower bound of the predetermined interval is no less than 1 (so that the multiplication of the original scale factor is no less than 1), and the upper bound of the predetermined interval is bound at a value for which the scale factor should not be multiplied by more than. In a particular example, the predetermined interval for the overemphasis multiplier is [1.0 2.0]. In such a particular example, $\lambda$ may equal 1.4. (It has been determined that this overemphasis multiplier value works well for certain voices; though a different value may be more desirable for other voices.) However, other intervals and/or particular overemphasis multipliers may be desirable as well.

Upon generation of a sequence of synthesized subject spectral envelopes, as discussed further below with respect to block 704, a corresponding sequence of scale factors may be applied to the respective synthesized subject spectral envelopes, so as to enhance the sequence of synthesized subject spectral envelopes. However, prior to applying the sequence of scale factors to the sequence of synthesized subject spectral envelopes, the scale factors may be smoothed. Smoothing of the sequence of the scale factors provides the benefit of limiting any undesirable "spikes" among the sequence of scale factors (so that, for example, one particular synthesized subject spectral envelope is not emphasized to a much greater extent than the next (or previous) synthesized subject spectral envelope).

In an example, the sequence of scale factors may be smoothed using a filter such as a zero-phase 3-tap filter. In a particular example, the zero-phase 3-tap filter may have an impulse response of h=[0.15 0.70 0.15]. It should be understood, however, that the sequence of scale factors may be smoothed using any suitable technique, including using other filters with other impulse responses.

It is of note that smoothing of the scale factors may be particularly desirable in instances where an overemphasis-scale factor is applied. In this way, the overemphasis of any "spikes" among the sequence of scale factors may be minimized.

Thus, in one aspect with respect to the functions that may be carried out in accordance with block 702, a plurality of HMM states may each generate a respective synthesized reference spectral envelope, each state having a respective determined scale factor that minimizes the statistical divergence between a respective natural reference spectral envelope and the respective synthesized reference spectral envelope. Further, the computing device may determine an overemphasis-scale. But, before determining the overemphasis-scale factor, the computing device may determine a respective smoothed scale factor corresponding to each determined scale factor. Accordingly, determining the overemphasis-scale factor based on the determined scale factor and the predetermined overemphasis multiplier may involve the computing device determining the overemphasis-scale factor based on the respective smoothed determined scale factor corresponding to the determined scale factor and the predetermined overemphasis multiplier.

b. Determine Enhanced Synthesized Subject Spectral Envelope Based on Determined Scale Factor At block 704, for a given synthesized subject spectral envelope generated by the state of the HMM, the computing device determines an enhanced synthesized subject spectral envelope based on the determined scale factor. In this way, the scale factor determined by the computing device in accordance with step 702 is used to help improve the quality of a given synthesized subject spectral envelope by determining an enhanced synthesized subject spectral envelope.

With reference again to FIG. 4, for purposes of example and explanation, a given HMM state within HMM database 408 of synthesis system 400 may generate a synthesized subject spectral envelope based on a particular segment of subject text 410. The synthesized subject spectral envelope may be represented as a series of parameters (e.g., MCEP coefficients), as generated by parameter generation component 412. As a general matter, the scale factor determined for the state of the HMM in accordance with block 702 may be applied to the synthesized subject spectral envelope so as to determine the enhanced synthesized spectral envelope in accordance with block 704.

The enhanced synthesized subject spectral envelope may be generated in any suitable manner. In a particular example, the enhanced synthesized subject spectral envelope may be generated (as represented by MCEP coefficients) according to the following equation:

$$\hat{c}(k)=c(k)\rho^{k},\ k=1{:}K \qquad \text{[equation 2]}$$

where ĉ(k) is the enhanced k-th MCEP coefficient of the enhanced synthesized subject spectral envelope, c(k) is the k-th MCEP coefficient of the synthesized subject spectral envelope, K is the number of MCEP coefficients that represent the synthesized subject spectral envelope, and ρ is the enhancement scale factor determined in accordance with block 702.

Note that the enhancement of the synthesized subject spectral envelope is performed by manipulation of the MCEP coefficients, in the quefrency domain. Manipulation of the MCEP coefficients using the constant ρ with an exponent of k can counteract, at least approximately, the over-smoothing effect observed in the subject spectral envelope within the frequency domain.

As briefly noted above, the effect of applying the scale factor to the synthesized reference spectral envelope is to increase the peak-to-null ratio between the formant peaks and the formant nulls of the synthesized reference spectral envelope. This helps counteract any oversmoothing (and reduces the perception of any "muffled" quality) resulting from the HMM synthesis and/or parameterization.

Thus, again, in accordance with block 702, the synthesized reference spectral envelope may be a parameterized synthesized reference spectral envelope that is parameterized based on a mel-cepstral parameterization. Further, in accordance with block 702, the natural reference spectral envelope may be a parameterized natural reference spectral envelope that is parameterized based on a mel-cepstral parameterization. Accordingly, determining the enhanced synthesized subject spectral envelope based on the determined scale factor, in accordance with block 704, may involve determining an enhanced parameterized synthesized subject spectral envelope.

As explained above with respect to equation 1, an overemphasis-scale factor may be determined, and may be applied to the synthesized subject spectral envelope so as to generate an overenhanced synthesized subject spectral envelope. The overenhanced synthesized subject spectral envelope may be generated in any suitable manner. In a particular example, the overenhanced synthesized subject spectral envelope may be generated according to the following equation:

$$\hat{\hat{\vec{c}}}=\vec{c}+B\vec{\epsilon} \qquad \text{[equation 3]}$$

where $\vec{\epsilon}$ is an enhancement vector (corresponding to the enhanced MCEP coefficients of a synthesized subject spectral envelope) with elements $\epsilon(k)=c(k)(\rho^{k}-1)$, B is a K-by-K high-pass transformation matrix, $\vec{c}$ is the synthesized subject spectral envelope, and $\hat{\hat{\vec{c}}}$ is the overenhanced synthesized subject spectral envelope.

In a particular example, high-pass transformation matrix B generally operates in equation 3 to reduce the effect of the enhancement vector $\vec{\epsilon}$ at frequencies less than 2 kHz. This is advantageous as relatively lower frequencies generally do not suffer as severely from oversmoothing as do higher frequencies, and so the overemphasis of such relatively lower frequencies would be unnecessary and/or undesirable. In other words, high-pass transformation matrix B minimizes an unnatural over-emphasis of low-frequency spectral regions.

In an example, the high-pass transformation matrix may take the form of the following equation:

$$B=C\#\Lambda C \qquad \text{[equation 4]}$$

where C is an L-by-K matrix that is made up of L uniform samples of the log-spectral-envelope (of the synthesized subject spectral envelope) in the interval [0.0, π], C# is the pseudo-inverse of C, and Λ is a diagonal L-by-L weighting matrix that is constructed so as to gradually suppress frequencies below approximately 2 kHz.

Figure 8:
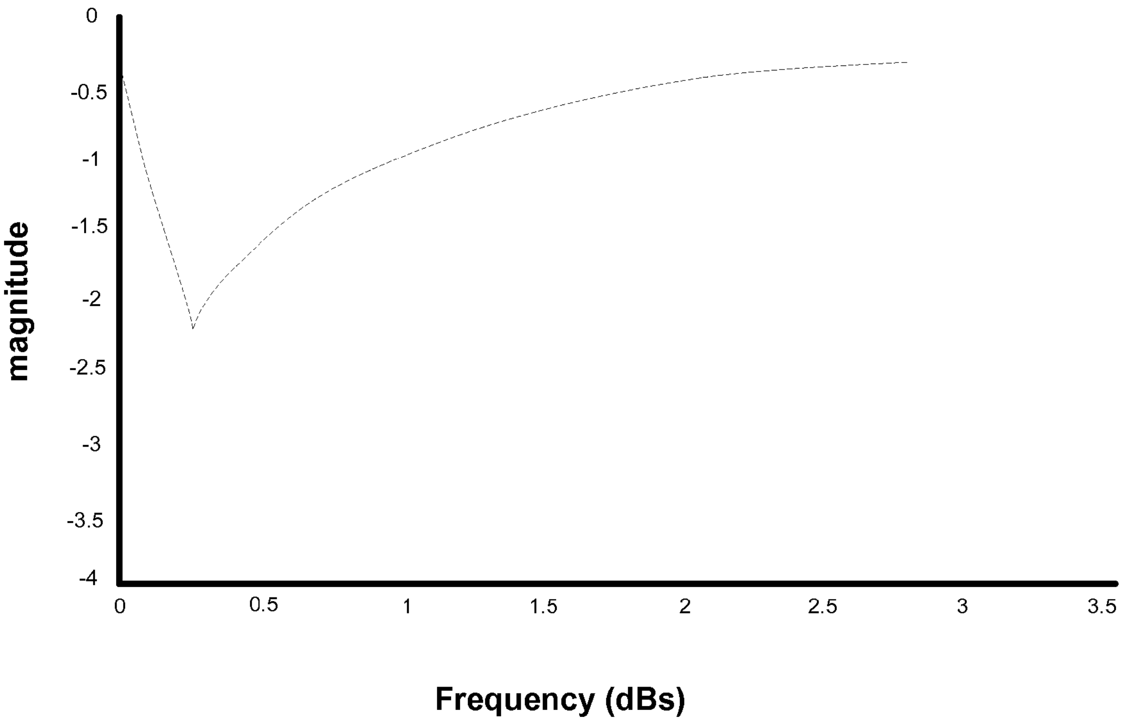
FIG. 8 shows the effects of an example high-pass transformation.

FIG. 8 shows an example embodiment of the frequency weighting filter that is realized via the diagonal frequency weighting matrix Λ. It should be understood that the example shown in FIG. 8 is provided for purposes of example and explanation, and that the high-pass transformation matrix may have other effects as well.

As shown by FIG. 8, as a result of the application of the high-pass transformation matrix, the effects of the emphasis factor and overemphasis factor on the synthesized subject spectral envelope will generally be attenuated at frequencies less than approximately 2 kHz and restored back again as frequency approaches zero. Indeed, as shown, as frequency approaches a fixed reference point, e.g. approximately 1 kHz, the attenuation of the emphasis factor and overemphasis factor becomes greater and greater such that the factors have relatively little (if not no) perceivable impact around that frequency. On the other hand, as the frequency increases (approaching, e.g., approximately 2 kHz), the attenuation of the emphasis factor and overemphasis factor becomes less and less such that the factors have approximately their full impact on frequencies close to and greater than approximately 2 kHz.

Thus, ultimately, the computing device may determine a filtered enhanced synthesized subject spectral envelope by passing the enhanced synthesized subject spectral envelope through a high-pass filter that suppresses frequencies below two kilohertz.

c. Generate Synthetic Speech Signal

At block 706, the computing device generates a synthetic speech signal including the enhanced synthesized subject spectral envelope. As a general matter the synthetic speech signal may include successive synthetic subject spectral envelopes generated by TTS synthesis system 400, concatenated together so as to create a synthesized utterance based on a portion of subject text.

In the context of the method described herein, in the event that a scale factor is applied to respective synthesized subject spectral envelopes, the synthetic speech signal may include successive enhanced synthesized subject spectral envelopes. Alternatively, in the event that an overemphasis-scale factor is applied to respective synthesized subject spectral envelopes, the synthetic speech signal may include successive overenhanced synthesized subject spectral envelopes.

In the context of example TTS synthesis system 400, the functions associated with block 706 may be carried out by synthesized speech component 416. Synthesized speech component 416 may include any suitable combination of hardware and/or software required to carry out the functions described herein. In particular, synthesized speech component 414 may include hardware and/or software necessary to carry out any suitable audio-signal generation technique including for example, various vocoding techniques, to generate a speech waveform from the respective enhanced synthesized subject spectral envelopes and/or overenhanced synthesized subject spectral envelopes.

5. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the flow diagrams, scenarios, and flow charts in the figures and as discussed herein, each step, block, and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks, and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A method comprising:

determining a scale factor that, when applied to a synthesized reference spectral envelope, minimizes a statistical divergence between a natural reference spectral envelope and the synthesized reference spectral envelope, wherein the synthesized reference spectral envelope is generated by a state of a Hidden Markov Model (HMM);

for a given synthesized subject spectral envelope generated by the state of the HMM, determining an enhanced synthesized subject spectral envelope based on the determined scale factor; and generating, by a computing device, a synthetic speech signal comprising the enhanced synthesized subject spectral envelope, wherein determining the scale factor that minimizes the statistical divergence between the natural reference spectral envelope and the synthesized reference spectral envelope comprises:

determining a statistical difference corresponding to each potential scale factor in a set of potential scale factors, wherein the number of potential scale factors in the set of potential scale factors is a predetermined number, and wherein each potential scale factor from the set of potential scale factors has a unique value that is within a predetermined interval; and selecting as the scale factor the potential scale factor in the set of scale factors having the smallest corresponding determined statistical difference.

2. The method of claim 1, wherein determining the scale factor that minimizes the statistical divergence between the natural reference spectral envelope and the synthesized reference spectral envelope further comprises determining a scale factor that minimizes a Kullback-Leibler distance between the natural reference spectral envelope and the synthesized reference spectral envelope.

3. The method of claim 2, wherein the synthesized reference spectral envelope is a modeled synthesized reference spectral envelope that is modeled based on a Multivariate Gaussian model, and wherein the natural reference spectral envelope is a modeled natural reference spectral envelope that is modeled based on the Multivariate Gaussian model.

4. The method of claim 1, wherein the synthesized reference spectral envelope is a parameterized synthesized reference spectral envelope that is parameterized based on a mel-cepstral parameterization, and wherein the natural reference spectral envelope is a parameterized natural reference spectral envelope that is parameterized based on a mel-cepstral parameterization.

5. The method of claim 1, wherein the predetermined number is 256, and wherein the predetermined interval is 1.0 to 1.10.

6. The method of claim 1, the method further comprising:

before determining the enhanced synthesized subject spectral envelope based on the determined scale factor, storing the scale factor in a look-up table using one of 8 bits or 16 bits.

7. The method of claim 1, wherein determining the enhanced synthesized subject spectral envelope based on the determined scale factor comprises determining an overenhanced synthesized subject spectral envelope based on an overemphasis-scale factor, the method further comprising:

determining the overemphasis-scale factor based on the determined scale factor and a predetermined overemphasis multiplier.

8. The method of claim 7, wherein the predetermined overemphasis multiplier is 1.4.

9. The method of claim 7, wherein the HMM comprises a plurality of states that each generate a respective synthesized reference spectral envelope, each state having a respective determined scale factor that minimizes s statistical divergence between a respective natural reference spectral envelope and the respective synthesized reference spectral envelope, the method further comprising:

before determining the overemphasis-scale factor, determining a respective smoothed scale factor corresponding to each determined scale factor, wherein determining the overemphasis-scale factor based on the determined scale factor and the predetermined overemphasis multiplier comprises determining the overemphasis-scale factor based on the respective smoothed determined scale factor corresponding to the determined scale factor and the predetermined overemphasis multiplier.

10. The method of claim 9, wherein the respective determined scale factors make up a sequence of scale factors, and wherein determining the smoothed scale factor corresponding to each respective determined scale factor comprises smoothing the sequence of scale factors using a three-tap filter with an impulse response of [0.15 0.70 0.15].

11. The method of claim 7, wherein the synthesized reference spectral envelope is a parameterized synthesized reference spectral envelope that is parameterized based on a mel-cepstral parameterization, wherein the natural reference spectral envelope is a parameterized natural reference spectral envelope that is parameterized based on a mel-cepstral parameterization, and wherein determining the enhanced synthesized subject spectral envelope based on the determined scale factor comprises determining an enhanced parameterized synthesized subject spectral envelope.

12. The method of claim 7, the method further comprising:

determining a filtered enhanced synthesized subject spectral envelope by passing the enhanced synthesized subject spectral envelope through a high-pass filter that suppresses frequencies below two kilohertz.

13. An article of manufacture including a non-transitory computer-readable storage medium, having stored thereon program instructions that, upon execution by a computing device, cause the computing device to perform operations comprising:

determining a scale factor that, when applied to a synthesized reference spectral envelope, minimizes a statistical divergence between a natural reference spectral envelope and the synthesized reference spectral envelope, wherein the synthesized reference spectral envelope is generated by a state of a Hidden Markov Model (HMM);

for a given synthesized subject spectral envelope generated by the state of the HMM, determining an enhanced synthesized subject spectral envelope based on the determined scale factor; and generating a synthetic speech signal comprising the enhanced synthesized subject spectral envelope, wherein determining the scale factor that minimizes the statistical divergence between the natural reference spectral envelope and the synthesized reference spectral envelope comprises:

determining a statistical difference corresponding to each potential scale factor in a set of potential scale factors, wherein the number of potential scale factors in the set of potential scale factors is a predetermined number, and wherein each potential scale factor from the set of potential scale factors has a unique value that is within a predetermined interval; and selecting as the scale factor the potential scale factor in the set of scale factors having the smallest corresponding determined statistical difference.

14. The article of manufacture of claim 13, wherein determining the scale factor that minimizes the statistical divergence between the natural reference spectral envelope and the synthesized reference spectral envelope further comprises determining a scale factor that minimizes a Kullback-Leibler distance between the natural reference spectral envelope and the synthesized reference spectral envelope.

15. The article of manufacture of claim 13, wherein determining the enhanced synthesized subject spectral envelope based on the determined scale factor comprises determining an overenhanced synthesized subject spectral envelope based on an overemphasis-scale factor, the computer-readable storage medium having stored thereon program instructions that, upon execution by the computing device, cause the computing device to perform operations further comprising:

determining the overemphasis-scale factor based on the determined scale factor and a predetermined overemphasis multiplier.

16. The article of manufacture of claim 15, wherein the HMM comprises a plurality of states that each generate a respective synthesized reference spectral envelope, each state having a respective determined scale factor that minimizes a statistical divergence between a respective natural reference spectral envelope and the respective synthesized reference spectral envelope, the computer-readable storage medium having stored thereon program instructions that, upon execution by the computing device, cause the computing device to perform operations further comprising:

before determining the overemphasis-scale factor, determining a respective smoothed scale factor corresponding to each determined scale factor, wherein determining the overemphasis-scale factor based on the determined scale factor and the predetermined overemphasis multiplier comprises determining the overemphasis-scale factor based on the respective smoothed determined scale factor corresponding to the determined scale factor and the predetermined overemphasis multiplier.

17. The article of manufacture of claim 15, the computer-readable storage medium having stored thereon program instructions that, upon execution by the computing device, cause the computing device to perform operations further comprising:

determining a filtered enhanced synthesized subject spectral envelope by passing the enhanced synthesized subject spectral envelope through a high-pass filter that suppresses frequencies below two kilohertz.

18. A system comprising:

one or more processors;

one or more computer readable media; and program instructions stored on the one or more computer readable media and executable by the one or more processors to cause the system to perform operations comprising:

determining a scale factor that, when applied to a synthesized reference spectral envelope, minimizes a statistical divergence between a natural reference spectral envelope and the synthesized reference spectral envelope, wherein the synthesized reference spectral envelope is generated by a state of a Hidden Markov Model (HMM);

for a given synthesized subject spectral envelope generated by the state of the HMM, determining an enhanced synthesized subject spectral envelope based on the determined scale factor; and generating a synthetic speech signal comprising the enhanced synthesized subject spectral envelope, wherein determining the scale factor that minimizes the statistical divergence between the natural reference spectral envelope and the synthesized reference spectral envelope comprises:

determining a statistical difference corresponding to each potential scale factor in a set of potential scale factors, wherein the number of potential scale factors in the set of potential scale factors is a predetermined number, and wherein each potential scale factor from the set of potential scale factors has a unique value that is within a predetermined interval; and selecting as the scale factor the potential scale factor in the set of scale factors having the smallest corresponding determined statistical difference.

19. The system of claim 18, wherein determining the scale factor that minimizes the statistical divergence between the natural reference spectral envelope and the synthesized reference spectral envelope further comprises determining a scale factor that minimizes a Kullback-Leibler distance between the natural reference spectral envelope and the synthesized reference spectral envelope.

20. The system of claim 18, wherein determining the enhanced synthesized subject spectral envelope based on the determined scale factor comprises determining an overenhanced synthesized subject spectral envelope based on an overemphasis-scale factor, and wherein the operations further comprise:

determining the overemphasis-scale factor based on the determined scale factor and a predetermined overemphasis multiplier.

21. The system of claim 20, wherein the HMM comprises a plurality of states that each generate a respective synthesized reference spectral envelope, each state having a respective determined scale factor that minimizes a statistical divergence between a respective natural reference spectral envelope and the respective synthesized reference spectral envelope, and wherein the operations further comprise:

before determining the overemphasis-scale factor, determining a respective smoothed scale factor corresponding to each determined scale factor, wherein determining the overemphasis-scale factor based on the determined scale factor and the predetermined overemphasis multiplier comprises determining the overemphasis-scale factor based on the respective smoothed determined scale factor corresponding to the determined scale factor and the predetermined overemphasis multiplier.

22. The system of claim 20, wherein the operations further comprise:

determining a filtered enhanced synthesized subject spectral envelope by passing the enhanced synthesized subject spectral envelope through a high-pass filter that suppresses frequencies below two kilohertz.

* * * * *